United States Patent
Frerking

(10) Patent No.: US 9,336,265 B2
(45) Date of Patent: *May 10, 2016

(54) SYSTEM AND METHOD FOR PROCESSING WEB SERVICE TRANSACTIONS USING TIMESTAMP DATA

(71) Applicant: WAL-MART STORES, INC., Bentonville, AR (US)

(72) Inventor: John Randy Frerking, Prairie Grove, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 204 days.

This patent is subject to a terminal disclaimer.

(21) Appl. No.: 13/960,266

(22) Filed: Aug. 6, 2013

(65) Prior Publication Data

US 2015/0046744 A1 Feb. 12, 2015

(51) Int. Cl.
  *G06F 17/30* (2006.01)
  *G06F 11/20* (2006.01)

(52) U.S. Cl.
  CPC ...... *G06F 17/30386* (2013.01); *G06F 11/2023* (2013.01); *G06F 17/30371* (2013.01)

(58) Field of Classification Search
  USPC .......................... 707/638, 662–663, 666, 689
  See application file for complete search history.

(56) References Cited

U.S. PATENT DOCUMENTS

| | | | |
|---|---|---|---|
| 6,611,498 B1 * | 8/2003 | Baker et al. ................... 370/252 |
| 7,165,116 B2 * | 1/2007 | Grove ................ H04L 12/2602 |
| | | | 709/203 |
| 7,349,871 B2 * | 3/2008 | Labrou et al. ............. 705/26.35 |
| 7,801,826 B2 * | 9/2010 | Labrou et al. ................... 705/67 |
| 7,865,584 B2 * | 1/2011 | Grossner ............. H04L 12/2602 |
| | | | 709/203 |
| 8,219,676 B2 * | 7/2012 | Jagadish et al. .............. 709/224 |
| 8,271,430 B2 * | 9/2012 | Willson ........................ 707/602 |
| 8,938,636 B1 * | 1/2015 | Hochschild ........... H04J 3/0661 |
| | | | 709/248 |
| 9,055,139 B1 | 6/2015 | Devireddy |
| 2003/0041227 A1 * | 2/2003 | Nakamatsu ....... G06F 17/30575 |
| | | | 712/200 |
| 2003/0065941 A1 * | 4/2003 | Ballard ................... H04L 63/04 |
| | | | 726/1 |
| 2004/0098350 A1 * | 5/2004 | Labrou et al. ................... 705/64 |
| 2004/0107170 A1 * | 6/2004 | Labrou et al. ................... 705/64 |
| 2004/0205099 A1 * | 10/2004 | Hagiwara ............... H04L 29/06 |
| | | | 709/200 |
| 2004/0213387 A1 * | 10/2004 | Chandrasekaran G06F 17/30353 |
| | | | 379/93.24 |
| 2005/0027543 A1 * | 2/2005 | Labrou et al. ..................... 705/1 |
| 2005/0028024 A1 * | 2/2005 | Kataoka .............. G06F 11/2038 |
| | | | 714/4.1 |

(Continued)

OTHER PUBLICATIONS

Notification of Transmittal of the International Search Report and the Written Opinion of the International Searching Authority from corresponding PCT/US2014/049976 dated Nov. 6, 2014.

(Continued)

*Primary Examiner* — Hanh Thai
(74) *Attorney, Agent, or Firm* — Schmeiser, Olsen & Watts LLP

(57) ABSTRACT

A system is provided that is adapted to service web-based service requests. In one implementation, a caching service is provided for storing and servicing web service requests. In one implementation, virtual computer systems may be used to service requests in a more reliable manner. Different operating modes may be configured for backup redundancy and the caching service may be scaled to meet service requests for a particular application. Also, methods are provided for exchanging timestamp information among web service transaction systems to reduce the amount of processing capability and bandwidth for ensuring database consistency.

17 Claims, 13 Drawing Sheets

(56) References Cited

U.S. PATENT DOCUMENTS

| | | |
|---|---|---|
| 2005/0044197 A1 | 2/2005 | Lai |
| 2005/0050112 A1* | 3/2005 | Chandrasekaran G06F 17/30353 |
| 2005/0198200 A1 | 9/2005 | Subramanian et al. |
| 2006/0165040 A1 | 7/2006 | Rathod |
| 2006/0195607 A1 | 8/2006 | Naseh et al. |
| 2007/0203944 A1 | 8/2007 | Batra et al. |
| 2007/0282858 A1 | 12/2007 | Arner |
| 2008/0235298 A1 | 9/2008 | Lin et al. |
| 2009/0043881 A1* | 2/2009 | Alstad ............... G06F 12/0813 709/224 |
| 2009/0113531 A1* | 4/2009 | Emmerich ............. H04L 63/20 726/6 |
| 2009/0287746 A1 | 11/2009 | Brown |
| 2009/0299987 A1* | 12/2009 | Willson .......................... 707/4 |
| 2010/0198972 A1 | 8/2010 | Umbehocker |
| 2010/0325371 A1* | 12/2010 | Jagadish et al. ............. 711/150 |
| 2011/0038633 A1* | 2/2011 | DeCusatis ............ H04L 41/064 398/79 |
| 2011/0131197 A1* | 6/2011 | Nielsen ............... H04L 67/2852 707/713 |
| 2011/0138027 A1* | 6/2011 | Friedmann ................ G06F 9/52 709/223 |
| 2012/0226712 A1 | 9/2012 | Vermeulen et al. |
| 2013/0174223 A1* | 7/2013 | Dykeman ............... G06F 21/10 726/4 |
| 2013/0318191 A1* | 11/2013 | Yin ........................ H04L 69/28 709/213 |

OTHER PUBLICATIONS

International Search Report and Written Opinion in related International Application No. PCT/US14/49966; mailed Nov. 6, 2014; 7 pages.

Non-Final Office Action in related U.S. Appl. No. 13/960,192, mailed on Oct. 21, 2015; 17 pages.

\* cited by examiner

SYSTEM AND METHOD FOR PROCESSING WEB SERVICE TRANSACTIONS USING TIMESTAMP DATA

BACKGROUND

There are many different methods for processing web-based service requests. For instance, there are systems for load sharing service requests among a number of server-based systems. Furthermore, there are a number of different types of requests that could be serviced by particular systems.

SUMMARY

According to one aspect, it is appreciated that it may be useful and particularly advantageous to provide a system that is capable of servicing one or more web-based service requests. According to one embodiment, a platform is provided that allows web-based service requests to be stored and served in a more reliable manner. For instance, a caching service may be provided that is capable of storing and tracking received requests, and responsive to failures in distributed computer system, is capable of transitioning those service requests to other distributed computer system resources. Conventionally, systems that fail during the processing of web-based requests generally do not fail gracefully, and service errors occur as a result.

Further, it would be beneficial to have a web-based service is capable of being scaled depending on particular clients or applications. For instance, a cloud-based platform may be provided that hosts applications that support multiple users, and each service for a particular provider may be tailored to meet the needs of the application. According to various embodiments, the caching service that is provided to support such applications may be adjusted to support certain fault tolerance levels, response times, failover scenarios, and data replication and backup requirements. Optimally, the caching service exhibits high-performance, is highly available, efficient, reliable, scalable and cost-effective.

According to one embodiment, the caching service may be configured in one of a number of different environments. For instance, the caching service may be configured as an active/single environment where a single caching service entity responds to one or more web-service requests. In another environment, a caching service may be configured as an active/active environment where two or more caching service entities receive and respond to one or more web service requests. In yet another implementation, a caching service be configured as an active/standby where two or more caching service entities receive one of the web service requests, but a single entity is responsible for committing transactions.

It is appreciated such a system to beneficial when implementing one or more data centers that include systems that serve as backup systems that respond to service web-service requests. For instance, active/active configurations may be used to cache across multiple data centers for the purpose of performing synchronous replication. In another example, active/standby configurations may be used to cash requests across multiple data centers for the purpose of performing asynchronous replication to a "hot" standby data center.

According to another embodiment, the caching system and support REST and SOAP service calls. According to another embodiment of the present invention, a caching system supports HTTP and HTTPS service calls. In another embodiment, the service calls may be encrypted (e.g., via SSL/TLS encryption). In one embodiment, the service requests may include commands such as POST, GET, PUT and DELETE requests. In one implementation, basic security may be provided for REST service requests (e.g., by providing support for userid/password authentication and authentication using RACF). In one implementation, basic security may be provided for SOAP service requests (e.g., by providing support for userid/password authentication using SOAP header, and authentication using RACF).

In yet another embodiment, a distributed method for updating timestamp information related to stored data is provided. For instance, it is appreciated that timestamp information for data may need to be made consistent across multiple datasets (e.g., located at different datacenters). It is realized that in high-volume transaction systems, it may not be feasible to adequately transmit timestamp information in an effective manner between systems. For instance, excessive network traffic would be created by synchronizing such timestamp information created by multiple updates and data accesses. Therefore, it is appreciated that it would be preferable to permit timestamp updates that minimize network traffic. Further, a capability may be provided that permits timestamp information to be maintained for a data element based on when the data was last accessed. For instance, most data elements only information that identified when a data element was last updated, not when it was last accessed.

According to one aspect, a system for processing web service requests is provided. The system comprises a server configured to receive and process web service requests, the server comprising a plurality of components comprising a plurality of virtual computer systems adapted to service received web service requests; a logical storage system coupled to the plurality of virtual computer systems, wherein each of the plurality of virtual computer systems shares a common storage that is adapted to store the received web service requests; and a request handler element adapted to distribute a web service request to at least one of the plurality of virtual computer systems for processing. In one embodiment, the web service requests include at least one of a group comprising a REST service request; and a SOAP service request. In one embodiment, the server configured to receive and process web service requests is operable in at least one of a group of operating modes, the group comprising an active/single mode; an active/standby mode; and an active/active mode.

In one embodiment, the system further comprises a load balancing element adapted to distribute the web service requests among a plurality of server systems. In one embodiment, the plurality of virtual computer systems are located within a partition. In one embodiment, a web service application is assigned to a particular partition. In one embodiment, the system further comprises transaction server components that are adapted to process web service transactions. In one embodiment, the logical storage system further comprises a common database shared by the plurality of virtual servers upon which web service requests are transacted. In one embodiment, the system further comprises an entity that monitors an expiration of a database record associated with at least one web service request.

According to one aspect, the system further comprises corresponding entities that execute among at least two of the plurality of virtual computer systems, the entities being adapted to compare timestamps associated with the database record associated with the at least one web service request. In one embodiment, the entity is adapted to delete the database record associated with the at least one web service request. In one embodiment, the at least two of the plurality of virtual computer systems execute within separate computer systems. In one embodiment, at least two of the virtual computer systems are located in different data centers. According to one aspect, a method for processing web service requests is provided. The method comprises out of receiving, by a load sharing entity, a plurality of web service requests from one or more client systems; storing, in a common storage location, the received plurality of web service requests; assigning at least one virtual computer system to process at least one of the plurality of web service requests stored in the common storage location; and providing a response to the one or more client systems that generated the at least one of the plurality of web service requests. In one embodiment, the at least one of the plurality of web service requests includes at least one of a group comprising a REST service request; and a SOAP service request. In one embodiment, the method further comprises an act of operating the at least one virtual computer system in at least one of a group of operating modes, the group comprising an active/single mode; an active/standby mode; and an active/active mode. In one embodiment, the method further comprises an act of distributing the plurality of web service requests among a group of virtual computer systems. In one embodiment, the group of virtual computer systems are located within a partition. In one embodiment, the method further comprises an act of assigning a web service application to the partition. In one embodiment, the method further comprises an act of sharing, by the group of virtual computer systems, the common storage location that stores the plurality of web service requests.

According to one aspect, a system for processing web service transactions is provided. The system comprises a plurality of servers each adapted to receive and process one or more web service requests, the plurality of servers comprising a first and second server of the plurality of servers are each configured to compare time stamps associated with at least one database record of a common database associated with a web service application. In one embodiment, the first server is adapted to delete the at least one database record of the common database associated with the web service application, if it is determined that timestamps of the first and second servers have expired, the timestamps being associated with the at least one database record of the common database. In one embodiment, the first and second servers are configured to update a timestamp associated with the at least one database record of the common database associated with the web service application responsive to an access to the at least one database record. In one embodiment, the first and second servers are located in a first and a second datacenter, respectively. In one embodiment, the plurality of servers includes a plurality of virtual servers. In one embodiment, the comparing of time stamps is responsive to a determination by one of the first and second servers that at least one of the time stamps is close to an expiration time. In one embodiment, the system further comprises a request handler element adapted to distribute a web service request to at least one of the plurality of servers for processing. In one embodiment, the system further comprises a component configured to monitor processing of web service requests by the at least one of the plurality of servers. In one embodiment, the system further comprises a component to determine a failover of the processing of at least one web service request to another one of the plurality of servers upon failure of the at least one server. In one embodiment, the web service requests include at least one of a group comprising a REST service request; and a SOAP service request. In one embodiment, the plurality of servers that receive and process web service requests are operable in at least one of a group of operating modes, the group comprises an active/single mode; an active/standby mode; and an active/active mode.

According to one aspect, a method for processing web service transactions is provided. The method comprises acts of receiving and processing, by a plurality of respective servers, one or more web service requests, wherein the method further comprises acts of comparing, by a first and second server of the plurality of servers are to compare time stamps associated with at least one database record of a common database associated with a web service application. In one embodiment, the method further comprises an act of deleting, by the first server, the at least one database record of the common database associated with the web service application, if it is determined that timestamps of the first and second servers have expired, the timestamps being associated with the at least one database record of the common database. In one embodiment, the method further comprises an act of updating, by the first and second servers, a timestamp associated with the at least one database record of the common database associated with the web service application responsive to an access to the at least one database record. In one embodiment, the method further comprises an act of locating the first and second servers in a first and a second datacenter, respectively. In one embodiment, the plurality of servers include a plurality of virtual servers.

In one embodiment, the act of comparing of time stamps is responsive to an act of determining, by one of the first and second servers, that at least one of the time stamps is close to an expiration time. In one embodiment, the method further comprises an act of distributing, by a request handler element, a web service request to at least one of the plurality of servers for processing. In one embodiment, the method further comprises an act of monitoring processing of web service requests by the at least one of the plurality of servers. In one embodiment, the method further comprises an act of determining a failover of the processing of at least one web service request to another one of the plurality of servers upon failure of the at least one server. In one embodiment, the web service requests include at least one of a group comprising a REST service request; and a SOAP service request. In one embodiment, the plurality of servers that receive and process web service requests are operable in at least one of a group of operating modes, the group comprising an active/single mode; an active/standby mode; and an active/active mode.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
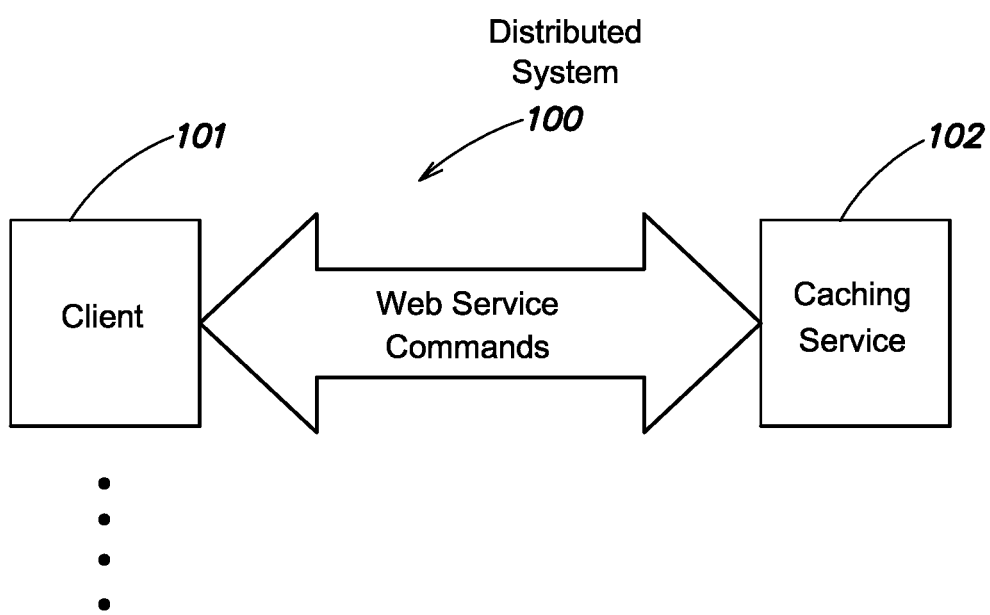
FIG. 1 is a block diagram showing a system for caching web service commands according to various aspects of the present invention.

FIG. 1 shows a block diagram of a distributed system 100 suitable for implementing various aspects of the present invention. In particular, according to one embodiment, FIG. 1 shows a system 100 that includes a caching service 102 that is capable of storing and servicing web service commands according to various embodiments of the present invention. More particularly, a caching service 102 may be provided that services one more web service commands received from one more clients (e.g., clients 101A-101C). Such web service commands may be serviced as part of a website, application service, storage or other web service type. It may be beneficial to provide a storage and command processing platform that is robust and capable of being scaled to any type of application.

Figure 2:
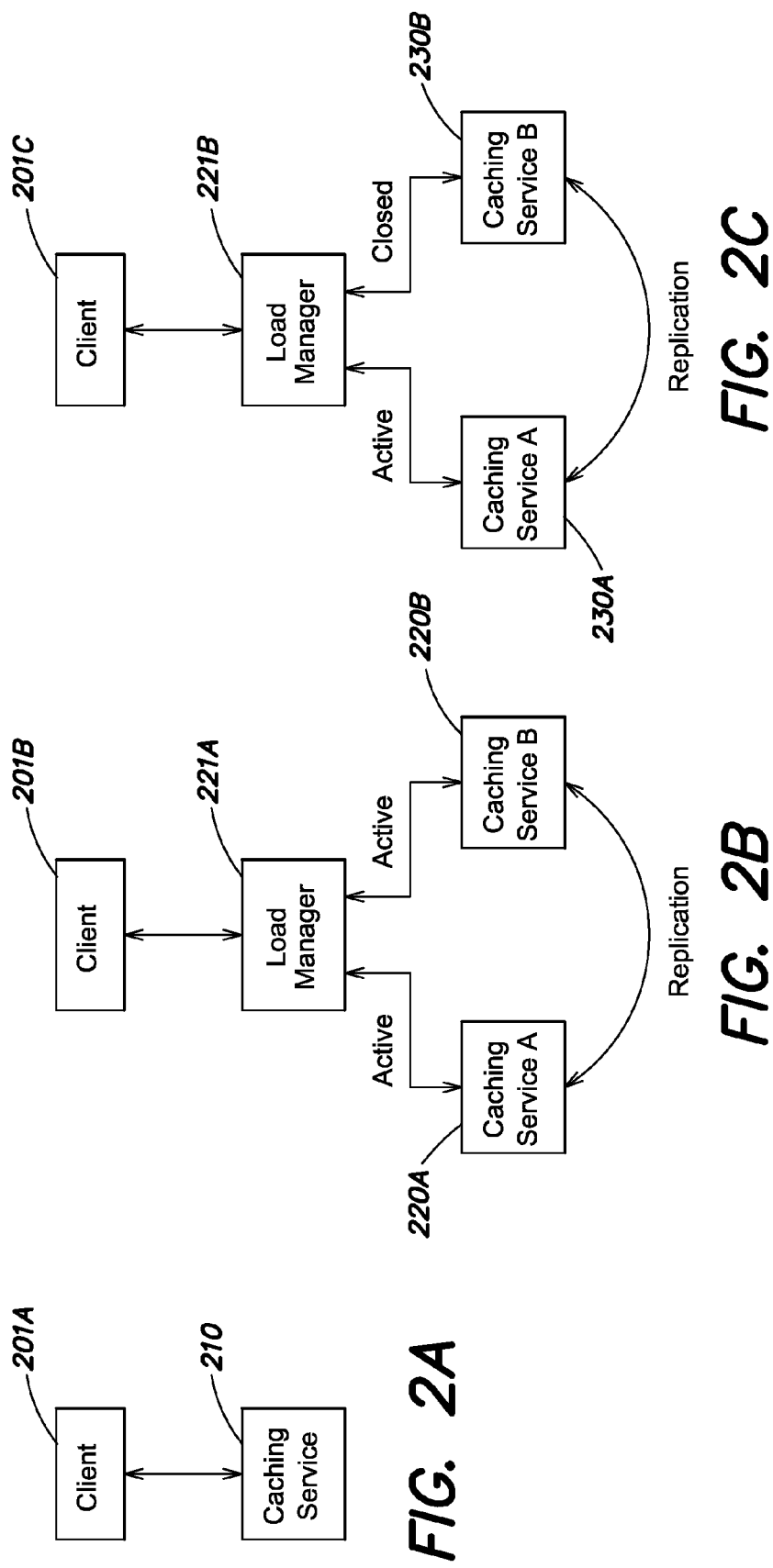
FIGS. 2A-2C show embodiments of various caching modes according to various embodiments of the present invention.

FIGS. 2A-2C show various embodiments of different caching service modes according to embodiments of the present invention. For example, FIG. 2A shows an active single mode where a single instance of the caching service (e.g., caching service 210) provides support and servicing of client requests (e.g. from client 201A). In what is referred to herein as an active/active configuration, a client (e.g., client 201B) sends a request to a load manager 221A that distributes requests to two or more caching services (e.g. caching service 220A, caching service 220B). In this configuration, the load manager sends requests to multiple services, and replication ensures that each caching service is consistent. FIG. 2C shows an active/standby configuration where one caching service (e.g., caching service A 230A) receives and processes requests through an active port, and where one or more other caching services (e.g., caching service B 230B) remains "closed" and does not receive and process requests directly.

According to one embodiment of the present invention, it is appreciated that a caching service may be configured using a virtualized environment with logical storage shared between virtual servers, and the caching service may direct web service requests to an available virtual server suitable for servicing the request. For instance, the caching service may direct the request to the most underutilized virtual server that is available. In another embodiment, requests may be stored in a common location accessible by multiple virtual servers, and therefore, replication of request data is not necessary between servers that share the common storage location. Further, upon failure of a particular server, another server may be tasked to service the request, accessing the request in common storage.

Figure 3:
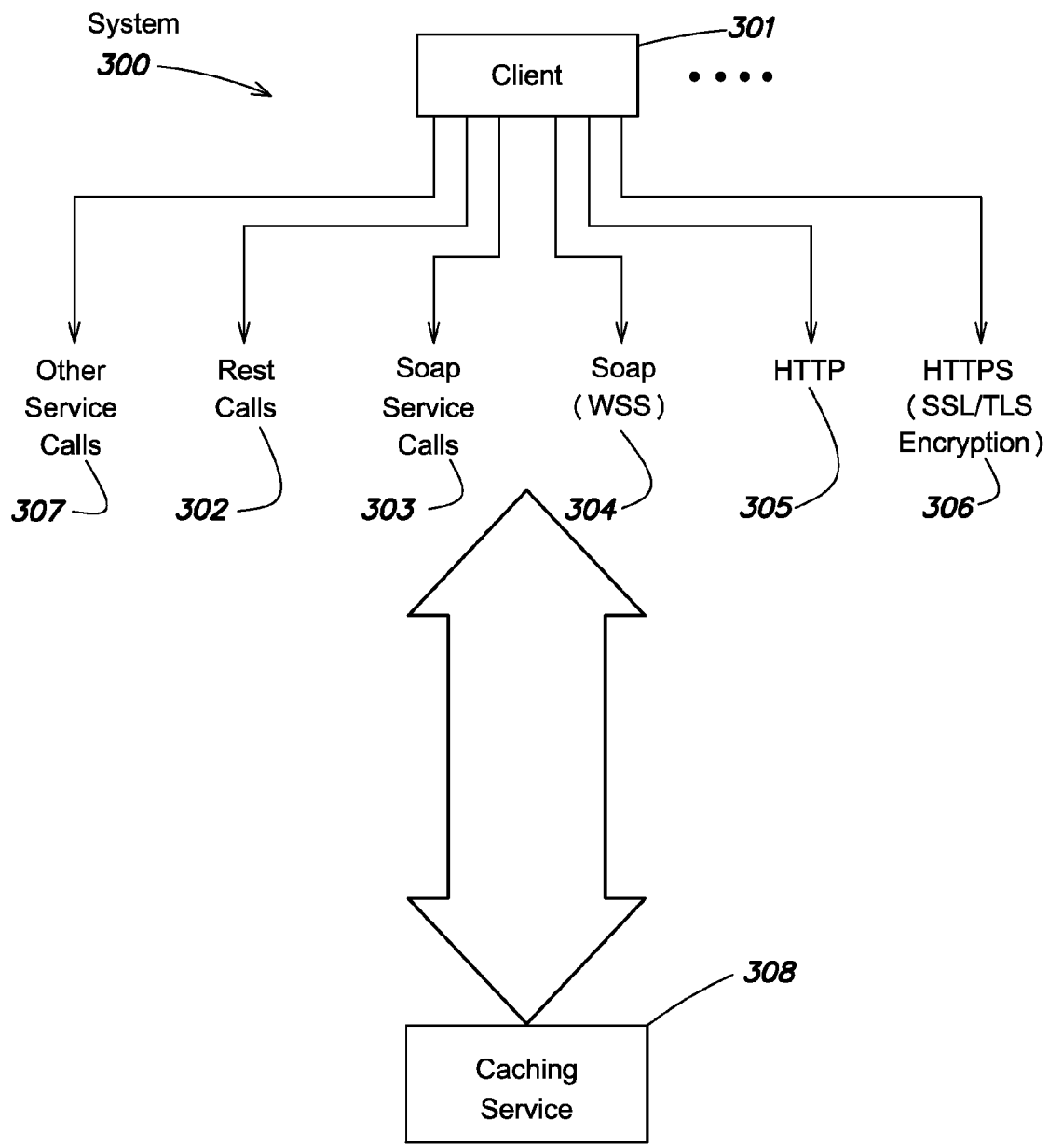
FIG. 3 shows a diagram of different web service requests that may be serviced according to various embodiments of the present invention.

FIG. 3 shows a diagram of different web service requests that may be serviced according to various embodiments of the present invention. For instance, a distributed system 300 may be used that includes a client 301 that initiates one or more web service requests that are serviced by a caching service (e.g., caching service 308). The service requests may include, but are not limited to, HTTPS (e.g., with SSL/TLS encryption) 306, HTTP requests 305, secure SOAP (e.g., using WS-Security or WSS) 304, SOAP service calls 303, REST calls 302, or other types of service requests 307. It should be appreciated that any type of request or message format may be used with various aspects of the present invention.

Figure 4:
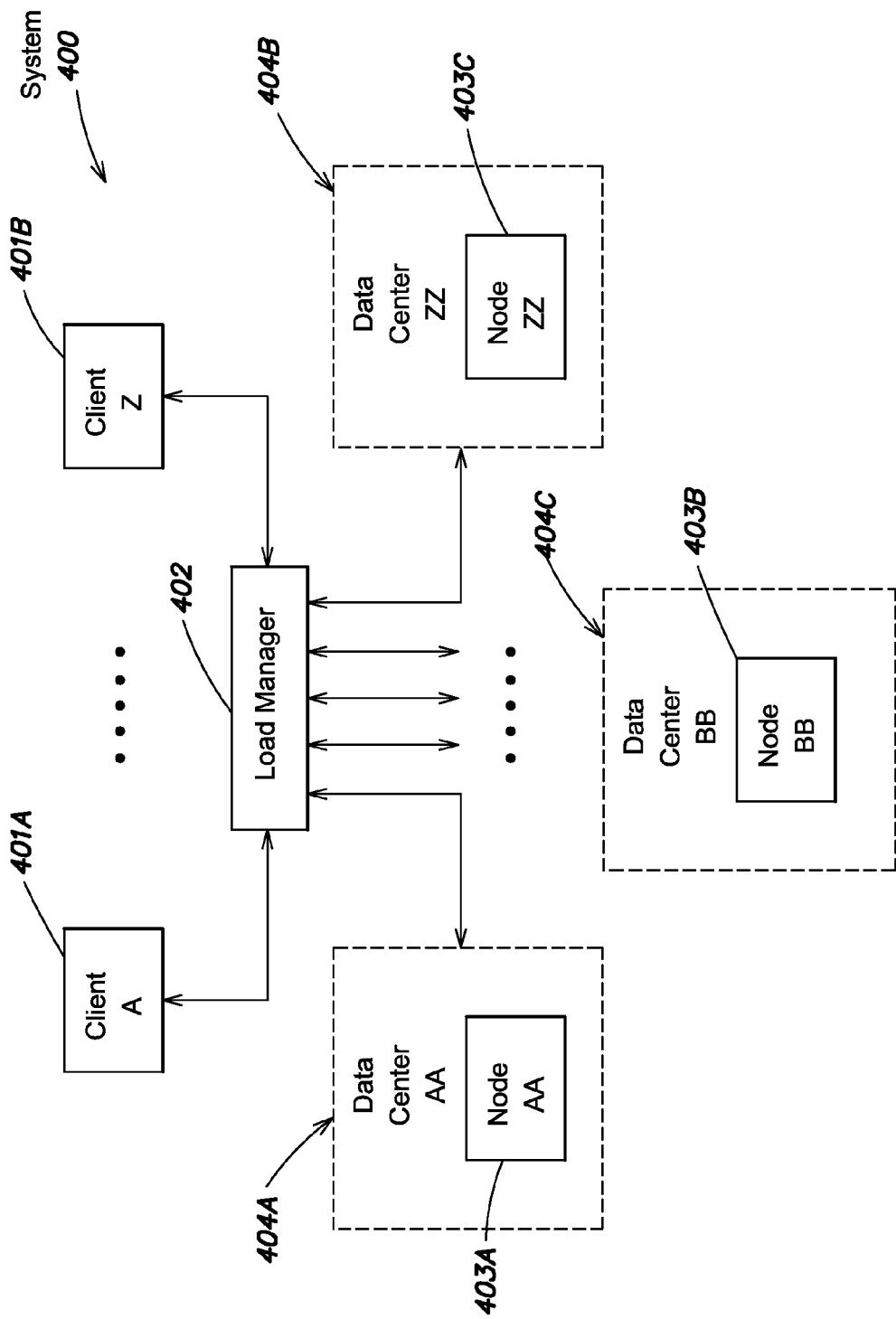
FIG. 4 shows an example configuration of a caching service according to one embodiment of the present invention.

FIG. 4 shows an example configuration of a caching service according to one embodiment of the present invention. It is appreciated that a caching service may be operated among multiple data centers in a distributed computer system 400 according to one embodiment of the present invention. For instance, requests received by clients (e.g., client A 401A, client Z 401B, etc.) may be directed to different data centers (e.g., data center AA 404A, data center ZZ 404B, data center BB 404C) by a load manager (e.g., load manager 402). Load manager 402 may be a router, a computer system or other type of specialized system capable of receiving requests and directing the requests to different data centers. Each data center may include one or more nodes or systems capable of servicing such requests. Such nodes may include, for example, node AA 403A, node BB 403B, node ZZ 403C. It is appreciated that such nodes may include physical systems, such as one or more server systems, a collection of systems (e.g., bladed server systems), a cluster of systems, mainframe computer system, or any type and configuration of systems. Such systems may also include virtualized resources such as virtual server systems, and may include one or more levels of virtualization. In one embodiment, such a caching system may be implemented across data centers to provide redundancy in the case of site or system failure.

Figure 5A:
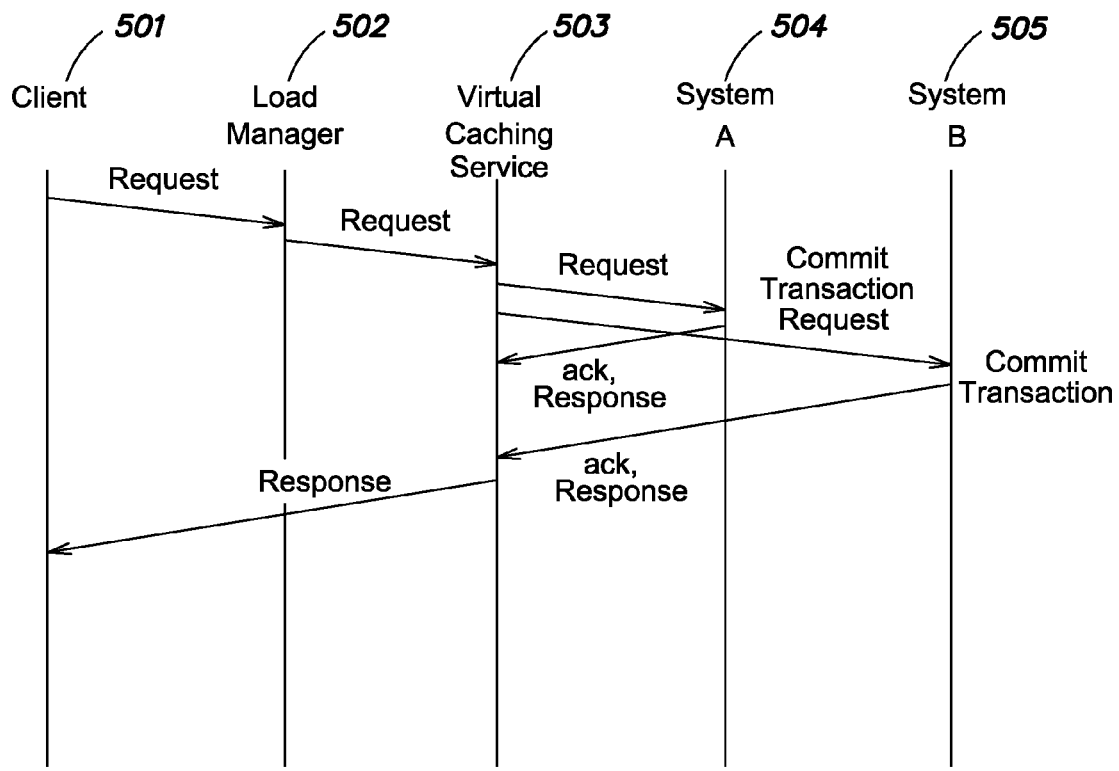
FIGS. 5A-5B show example processes performed by a caching service according to one embodiment of the present invention.
Figure 5B:
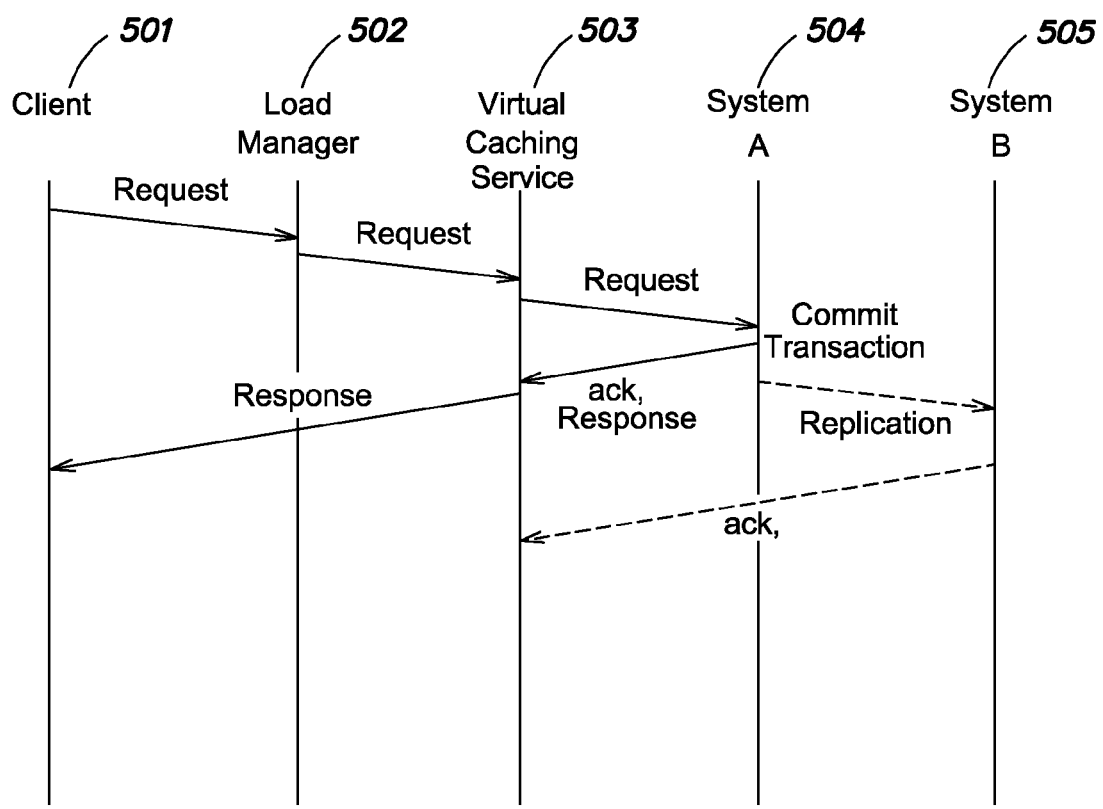

FIGS. 5A-5B show example processes performed by a caching service according to one embodiment of the present invention. In particular, FIG. 5A shows an active/active configuration where requests are sent to a number of systems simultaneously. In the event of failure, one of the active caching systems continues to operate.

In the example shown, a client (e.g., client 501) sends a request to a load manager (e.g., load manager 502) which directs the request to a caching service. According to one embodiment, the caching service may be a virtual caching service implemented on a virtual computer system. For instance, the virtual computer system may include one or more virtual servers that receive requests and direct them to one or more systems to be processed. For instance, virtual caching service 503 main direct a request in an active/active configuration to both a system A 504 and a system B 505 for processing. In an active/active configuration, both system A and system B receive and process the request and provide an acknowledgment and response to the virtual caching service 503. The virtual caching service 503 provides a response directly to client 501.

FIG. 5B shows an active/standby configuration where two or more caching service entities receive one of the web service requests, but a single entity is responsible for committing transactions. The client 501, load manager 502, virtual caching service 503, and systems (e.g., systems 504, 505) may be configured to operate in active/standby or active/active mode as discussed above. According to one embodiment, the virtual caching service 503 directs a request to one of the systems (e.g., system 504) responsible for committing the transaction, and the responsible system replicates any necessary data to the other system (e.g., system 505). Virtual caching service 503 is configured to respond to client 501 once a response is received from the responsible system (e.g., system 504). As the standby system (e.g., system 505) does not receive the request directly, the standby system takes over only upon failure of the primary system (e.g., system A).

Figure 6:
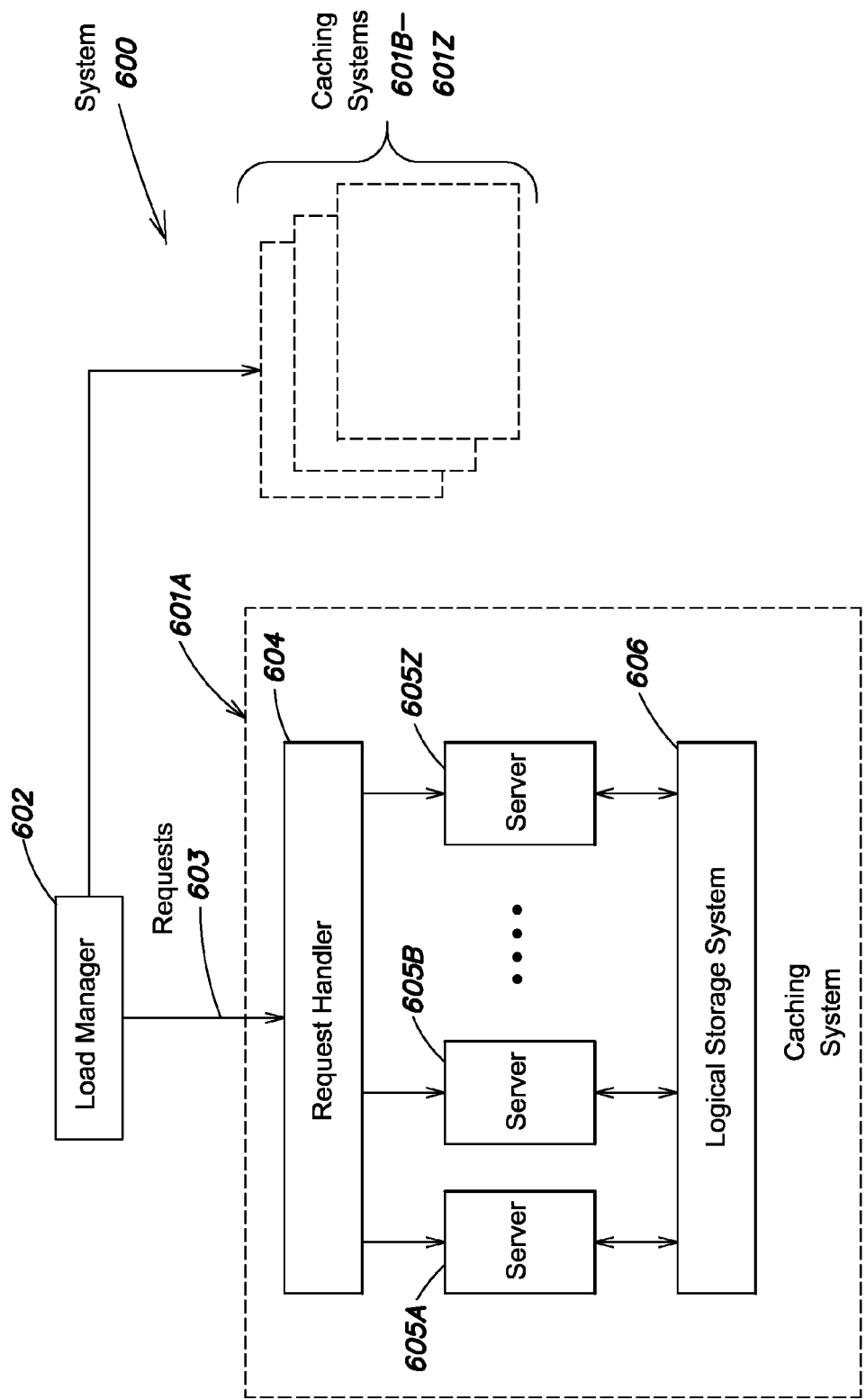
FIG. 6 shows an example computer system with which various aspects of the invention may be practiced.

FIG. 6 shows an example computer system with which various aspects of the invention may be practiced. For example, a distributed system 600 may be provided that caches web service requests according to various embodiments of the present invention. System 600 includes one or more caching systems (e.g., 601A-601Z) that operate to receive and process requests. System 600 may also include a load manager 602 that directs receive requests (e.g., requests 603) to one or more caching systems for processing. Each caching system may also include a request handler 604 that determines, within the caching system, what systems will be processing each request. In one example implementation, a number of servers (e.g., servers 605A-605Z) are configured to receive requests directed to them from the request handler 604. Each of the servers may be provided access to a logical storage system 606 where transactions may be committed. Further, requests that are received by the request handler 604 may be stored within a common area whereby servers may access and process received requests. If a failure occurs, and the request is not processed, another server may be capable of servicing the request.

Figure 7:
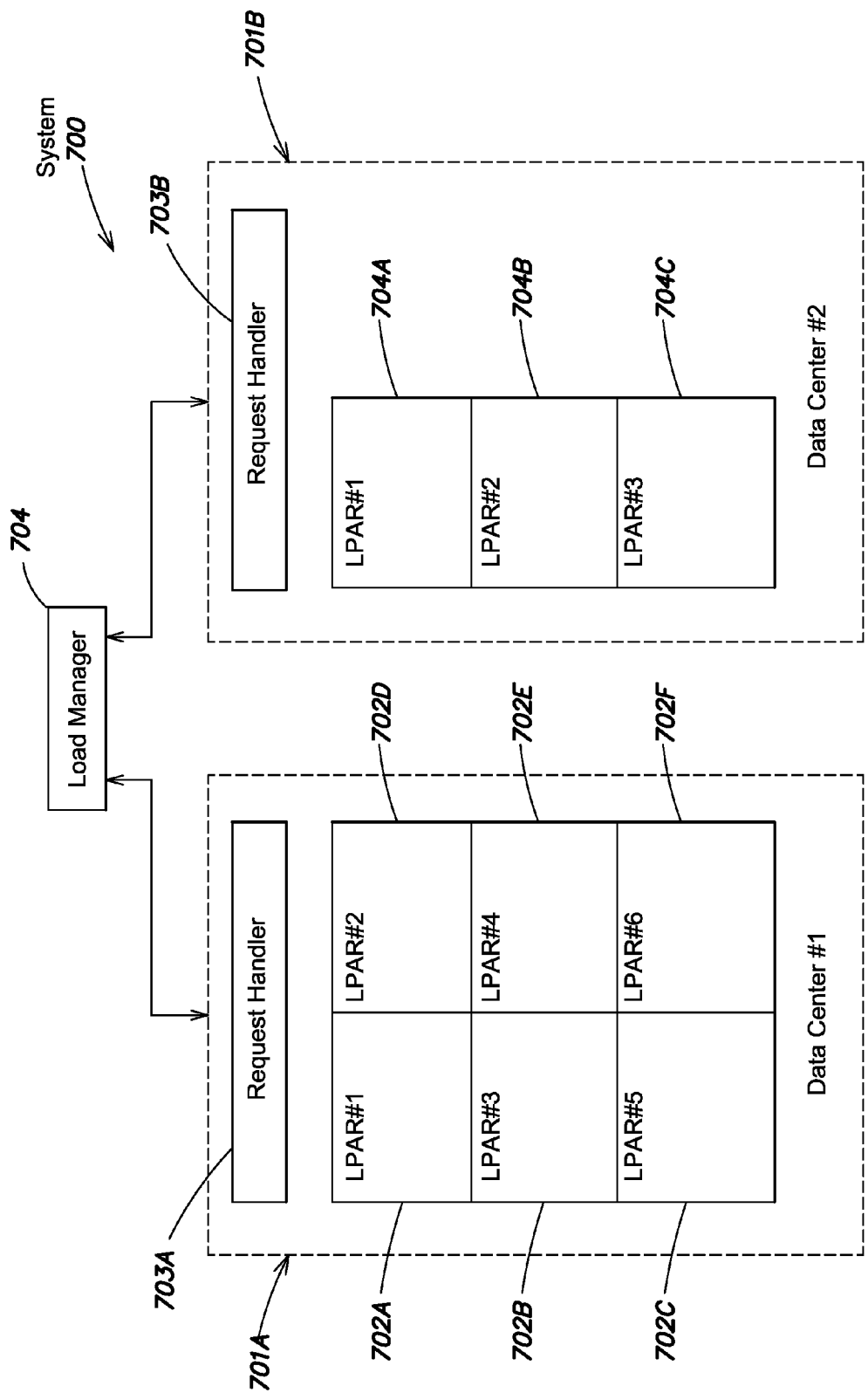
FIG. 7 shows one example implementation of a caching service using logical partitions distributed among multiple data centers according to one embodiment of the present invention.

FIG. 7 shows one example implementation of a caching service using logical partitions distributed among multiple data centers according to one embodiment of the present invention. In particular, it should be appreciated that a caching server may be implemented within a system having logical partitions. A logical partition (LPAR) is the division of a computer processor, memory, and storage into multiple sets of resources so that each set of resources can be operated independently with its own operating system instance and applications. A logical partition may be defined that exists on a single computer system or group of computer systems. For example, many systems, including but not limited to standalone computer systems, groups of computers, clusters, mainframes, and other types of systems may use logical partitions.

As shown in FIG. 7, a distributed system 700 may be provided that includes a number of data centers each having one or more request handlers and logical partitions. For instance, the caching service in a data center #1 (item 701A) may include a request handler (TCP/SD) 703A similar to request handler 604 of FIG. 6. Further, a data center #2 may include a similar request handler (TCP/SD) 703B. Such handlers may receive requests and allocate them to processing entities to be serviced.

As discussed, a caching service may include one or more servers or other processing entities that are capable of processing requests. For instance, as discussed, such entities may include logical partitions or LPARs. In the example shown, the data center #1 may include a number of LPARs (e.g., LPAR#1-LPAR#6 (items 702A-702F)) that are adapted to receive and process requests from request handler 703A. Further, in the example shown, a data center #2 may include a number of LPARs (e.g., LPAR#1-LPAR#3 (items 704A-704C)) that are adapted to receive and process requests from request handler 703B. According to one embodiment, users, organizations, applications or other entities may be assigned to a particular caching service, and that caching service may have an assignment of particular resources (e.g., LPARs, storage, etc.) to fulfill the service requirements for web requests associated with the caching service. Such resources may be allocated to particular entities using, for example, a management interface that is used to set up the caching service for a particular entity.

Figure 8:
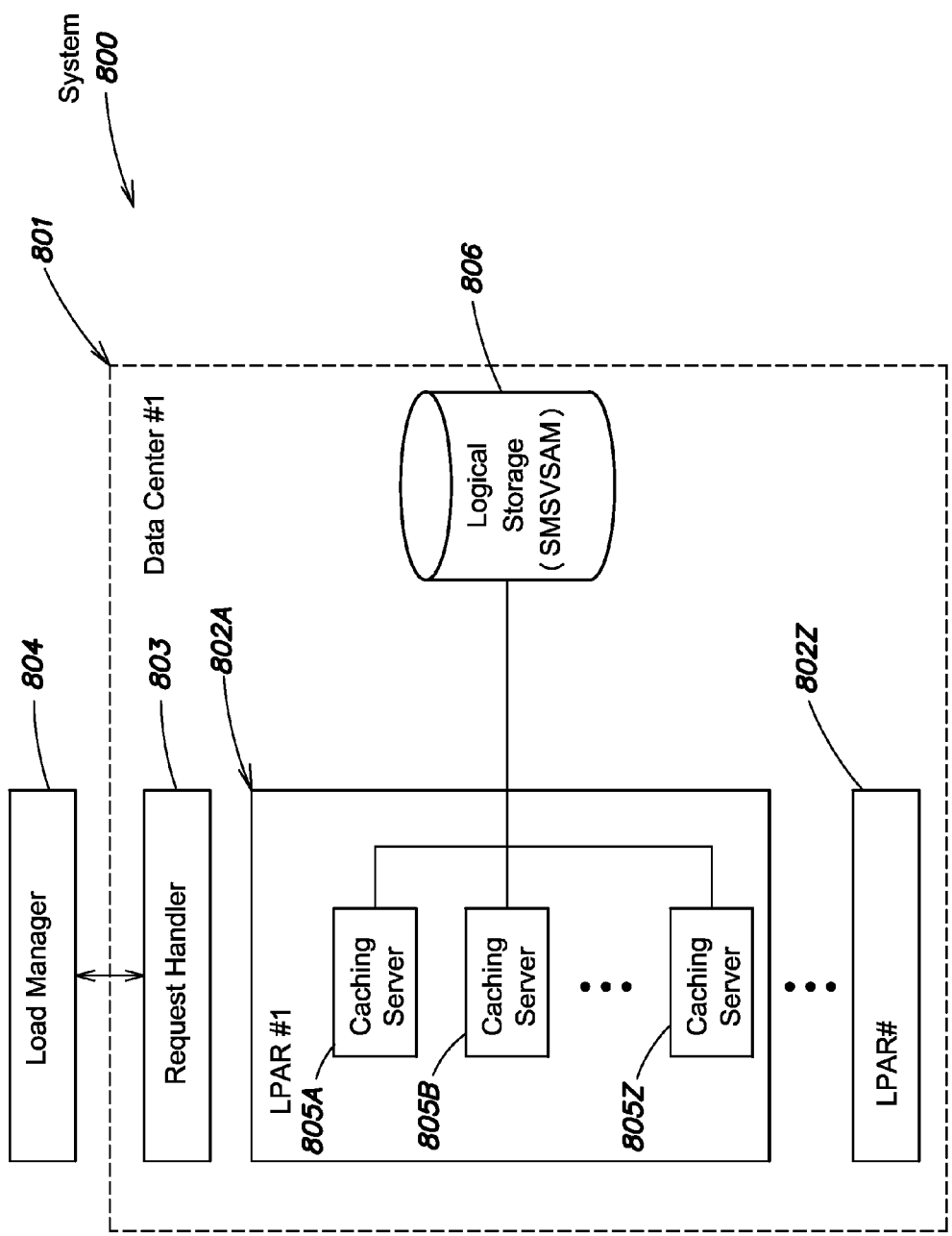
FIG. 8 shows a more detailed implementation of a caching service that utilizes multiple caching servers within a logical partition according to one embodiment of the present invention.

FIG. 8 shows a more detailed implementation of the caching service that utilizes multiple caching service within a logical partition according to one embodiment of the present invention. For instance, a distributed system 800 is shown including a data center #1 and a defined caching service. System 800 includes a load manager 804 that performs similar functions as discussed above. The caching service also includes a request handler 803 that receives web service requests.

In one implementation, within a particular LPAR (e.g., LPAR #1 (item 802A)), one or more caching servers (e.g., caching servers 805A-805Z) may be defined that are capable of servicing web service requests. Such servers may include, for example, one or more virtual servers that are defined within the particular LPAR. Other LPARs (e.g., LPAR 802Z) may also have caching servers defined within these other LPARs. According to one embodiment, multiple caching servers are permitted to access a logical storage entity for the purpose of servicing requests. Logical storage may include, for example, one or more physical storage devices, servers, or other entities capable of storing data. For instance, a logical storage entity 806 may be commonly accessed by multiple caching servers. The caching servers may share the same logical address space with other servers, and therefore may be capable of servicing requests associated with a particular defined caching service.

In one implementation, the caching service may be implemented in an IBM mainframe environment. For instance, the caching service may be implemented using LPARs as defined in the IBM z/OS environment, as known in the art. Multiple LPARs running z/OS can form a sysplex or parallel sysplex, whether on one machine or spread across multiple machines. Further, such systems may use a logical storage entity such as a VSAM (virtual storage access method) as is used with the z/OS, wherein an enterprise can organize records in a file in physical sequence (the sequential order that they were entered), logical sequence using a key (for example, the employee ID number), or by the relative record number on direct access storage devices (DASD). Although some examples are shown using an IBM mainframe environment, it should be appreciated that other virtualized computer system types having common storage capabilities may be used, and aspects of the present invention may be used other similarly-configured systems.

Figure 9:
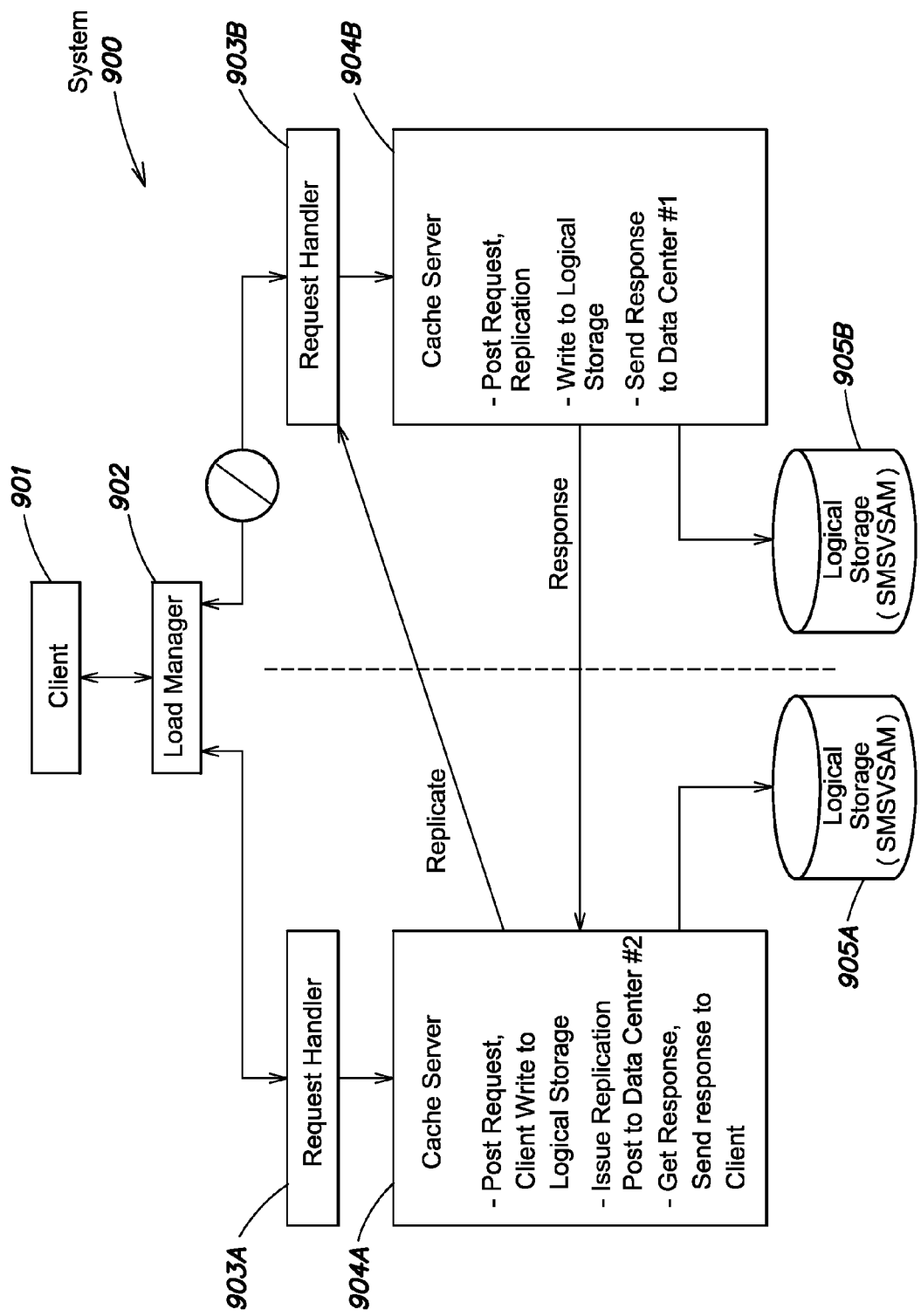
FIG. 9 shows a process of caching service requests and storing requests in logical storage according to one embodiment of the present invention.

FIG. 9 shows an example process of caching service requests and storing requests in logical storage according to one embodiment of the present invention. In a distributed computer system 900, a client 901 communicates a request to a load manager 902. The load manager sends the request to a request handler 903A. In the case of FIG. 9, the caching service is configured in an active/standby mode, where the request is not forwarded to the other request handler of the cache server (e.g., request handler 903B associated with cache server 904B).

In the example shown in FIG. 9, cache server 904A receives the request, performs a post operation on the request which results with a right to logical storage. In the active/standby mode, the first cache server issues a replication post to the request handler of the caching system of data center #2. Request handler 903B sends the request to a suitable cache server (e.g., cache server 904B) which hosts the requests and rights to logical storage (e.g., logical storage 905B). The standby cache server sends a response to the active cache server of data center #1. The active cache server receives the response and sends the response to the client. In this way, the standby and active servers in both data centers are updated, and upon failure of the active server, the standby server may begin servicing requests (e.g., when the load manager 902 forwards requests to a port of the standby server).

In a more detailed example, there are three configurations available to each partition or user of the caching service:
  active/single
  active/standby
  active/active In one embodiment, the configuration is set for each partition/user by using a parameter file that specifies the mode of operation. In one embodiment, each active/single data center has its own URL/port combination, and clients are configured to referencing the URL/port directly in their requests. In an active/standby configuration, the caching system may have a URL/port managed by a monitoring component (e.g., a load manager or other entity), and client requests reference the monitoring component (e.g., load manager, load balancer, router or other entity). In the active/standby configuration, a client does not reference the active/standby URL/port directly, as only the monitoring component (e.g., a network router and load balancer) references the active/standby URL/port.

In one implementation, in the active/active has a URL/port managed by the caching server monitor, with client requests referencing a network router and load balancer.
A client does not reference the active/active URL/port directly, as only the network router and load balancer references the active/active URL/port.

When in an active/single configuration, a caching server partition/user is defined to one data center within a virtual computing system. For instance, a z/OS Parallel Sysplex may be used, and as is known, the z/OS Parallel Sysplex combines two basic capabilities of parallel processing and enabling read/write data sharing across multiple systems with full data integrity. A z/OS Parallel Sysplex configuration may include two or more physical zEnterprise servers (CPC/CEC (where CPC is a central processor complex, and CEC is a central electronic complex or mainframe "box")), two or more logical partitioned operating systems (LPAR) and two or more virtual transaction servers (e.g., implemented as virtual servers, also commonly referred to as "regions"). One virtual transaction server that may be used in the IBM mainframe environment includes the well-known CICS server. The CICS (Customer Information Control System) servers is a well-known family of application servers and connectors provided by IBM that provides industrial-strength, online transaction management and connectivity for mission-critical applications.

In one example implementation, a client application that uses a caching service according to various embodiments sends a REST/SOAP web service request to one URL for an active/single port for a specific data center and the request handler (e.g., a z/OS TCP/SD (Sysplex Distributor) and WLM (work load manager)) routes the request to the 'best performing' LPAR and CICS server. Because the request database (e.g., a cache file stored by SMSVSAM and/or CFDT) are accessible to all CICS servers and z/OS LPARs, there is no replication necessary between LPARs and/or CICS regions. With the z/OS Parallel Sysplex, TCP/SD, WLM, multiple LPAR and CICS servers, the active/single provides high availability (HA) and load balancing. Should the entire z/OS Parallel Sysplex fail, there is no recovery or replication required when the system is restarted.

When in an active/standby configuration, a caching server partition/user is defined to one data center within a z/OS Parallel Sysplex as 'active' and another data center within a z/OS Parallel Sysplex as 'standby'. Both active and standby systems are "live" and include two or more zEnterprise servers (CPC/CEC), two or more logical partitioned operating systems (LPAR) and two or more CICS servers (e.g., virtual servers). The client application that uses the caching service sends a REST/SOAP request to one URL, which is handled by a network router and load balancer, which then routes the request to the active/standby port on both data centers.

The active system maintains the client port opened, allowing requests from the network router and load balancer. However, the standby system maintains the client port closed. The closed port signals the network router and load balancer to send requests to the active system, which maintains the open client port. The client port on both the active and standby systems are monitored and managed by a caching server background process.

According to one embodiment, while requests are being processed by the active system, asynchronous replication is performed on the request through an internal port only known by caching server to the standby system. The internal port, used by both active/standby and active/active is only known to caching server systems and does not process any requests from caching server clients and/or network router and network load balancers. With the z/OS Parallel Sysplex, TCP/SD, WLM, multiple LPAR and CICS servers, the active/standby provides high availability (HA) and load balancing within the active Sysplex. Should the entire Active z/OS Parallel Sysplex fail, the caching server monitor (background process) on the standby system detects the situation, then immediately opens the client port and sets the caching server monitor control file as 'in recovery' status for the system and for each partition/user.

When the client port is available, the network router and load balancer then begins routing all active/standby requests to the new 'active' system, which previously was marked/designated as 'standby'. Because caching server requests were being replicated from the other system before the failure, the cached information is readily available when the client port becomes active, except for messages that were between client response and asynchronous replication. For those records in this situation, the next GET request returns a 'not found' status, prompting the client to issue another POST to create the record in the new Active system.

When the failed z/OS Parallel Sysplex, LPARs and the CICS servers are restarted, the active/standby client port is defined as 'closed', preventing the network router and load balancer from sending caching server requests to the new 'Standby' system, however the internal port known only to caching server is defined as 'open'. On the active system, a caching server monitor (e.g., a background process) detects that the caching server CICS servers are now available through the internal port, which initiates a background process on the active system side that begins the recovery process. Each caching server partition/user includes a 'recovery' task started by the caching server monitor which reads through the caching server file system and issues a POST request across the internal port to the standby system. When each recovery task completes, a status record for each caching server partition/user is updated in the caching server master control file, which is used by the caching server monitor process. During this recovery process, client requests are being processed on the active system, with asynchronous replication being performed on the request through the internal port to the Standby system. Both recovery and replication requests are processed concurrently across the internal port between the active and standby systems. When the recovery task(s) are complete, replication continues for client requests received through the client port on the active system, and the caching server monitor control file is set as 'recovery complete' for the system and for each partition/user. The client port on the newly recovered 'active' system is opened and the client port on the 'standby' system is closed, shifting the workload back to the primary active/standby configuration for those partitions/users within the two data center clusters.

When in the active/active configuration, a partition/user that uses the caching service is defined to two data centers, providing a z/OS Parallel Sysplex each defined as 'active'. Both active systems are "live" and include two or more zEnterprise servers (CPC/CEC), two or more logical partitioned operation systems (LPAR) and two or more CICS servers (e.g., implemented as virtual servers).

According to one implementation, a client application that uses the caching service sends a REST/SOAP request to one URL, which is handled by a network router and load balancer, which then routes the request to the active/active port on both data centers. The client port on both active/active systems is opened allowing the network router and load balancer to send requests to both active/active systems. While requests are being processed by the active system that receives the request, synchronous replication is being performed on the request through an internal port only known by caching server. The internal port, used by both active/standby and active/active is only known to caching server systems and does not process any requests from caching server clients and/or network router and network load balancers. With the z/OS Parallel Sysplex, TCP/SD, WLM, multiple LPAR and CICS servers, the active/active provides high availability (HA) and load balancing within the active Sysplex. Should an entire active z/OS Parallel Sysplex fail, the caching server monitor (background process) on the other active system detects the situation, and sets the caching server monitor control file as 'in recovery' status for the system and for each partition/user. When the failed z/OS Parallel Sysplex, LPARs and CICS servers are restarted, the active/active client port is defined as 'closed', preventing the network router and load balancer from sending caching server requests and the caching server monitor control file is set as 'in recovery' status for the system and for each partition/user. The internal port on the recovering system is open during restart. On the opposite active system, a caching server monitor (background process) detects the caching server CICS servers are now available through the internal port, which initiates a background process on the active side that begins the recovery process.

Each caching server partition/user includes a 'recovery' task started by the caching server monitor which reads through the caching server file system and issues a POST request across the internal port to the recovering active system. When each recovery task completes, a status record for each caching server partition/user is updated in the caching server master control file on both systems, which is used by a monitor process of the caching server. During this recovery process, client requests are processed on the active system, with synchronous replication being performed on the request through the internal port to the recovering active system. Both recovery and replication requests are processed concurrently across the internal port between the active and recovering systems. When the recovery task(s) are complete, the port on the recovering system is set to 'opened', enabling the network router and load balancer to send requests to both active/active systems. The caching server monitor control file is set as 'recovery complete' for the system and for each partition/user on both active/active systems.

According to one embodiment, new commands may be provided that implement various basic functions (e.g., POST, GET, PUT and DELETE commands) in a caching system according to various embodiments of the present invention. For example, one process that may be defined according to various embodiments, is a key delete process. For instance, when a DELETE request from the client specifies a key in the URI, a specific record from the caching server is deleted with the request replicated to the opposite (remote) data center. For instance, in a large database, a user may desire to delete a large number of product entries in the database, and thus, by specifying a key range, a single DELETE operation may be performed (e.g., by matching a pattern).

Another option that may be supported by the DELETE request may include a list of keys to be deleted using a 'regex' or regular expression verb on the URI. On a DELETE request with &regex specified on the URI, caching server will delete a list of keys that match the pattern specified in the &regex command. Patterns for &regex may be specified as follows:

| | |
|---|---|
| /key®ex=* | Delete all keys |
| /key®ex=Sam* | Delete keys that start with Sam (inclusive of a key 'Sam') |
| /key®ex=Sam*1 | Delete keys that start with Sam and ending with '1' |
| /key®ex=*Sam* | Delete keys that contain the word Sam |

According to one embodiment, during the delete process, only records with a time stamp of equal or older than 'current' time are deleted. This feature allows records to be added/updated (POST/PUT) during a delete process when &regex has been specified.

Another feature that may be provided with the delete request when &regex has been specified includes a 'synchronous delete request' (SDR) or an 'asynchronous delete request'(ADR). The .SDR or .ADR may be specified in the final qualifier of the URI that precedes the key portion of the URI. When .SDR is requested, the delete process is performed synchronously, then the response is returned to the client. When .ADR is requested, the delete process is performed asynchronously after the response has been returned to the client.

In another example, another process that may be defined according to various embodiments, is a key retrieval process or GET. When a GET request from the client specifies a key in the URI, a specific record from caching server is returned. Another option associated with the GET request includes a list of keys to be returned (instead of actual record data) using a 'regex' or regular expression verb on the URI. On a GET request with &regex specified on the URI, caching server may be adapted to return a list of keys that match the pattern specified in the &regex command. Patterns for &regex may be as follows:

| | |
|---|---|
| /key®ex=* | Return all keys |
| /key®ex=Sam* | Return keys that start with Sam (inclusive of a key 'Sam') |
| /key®ex=Sam*1 | Return keys that start with Sam and ending with '1' |
| /key®ex=*Sam* | Return keys that contain the word Sam |

It should be appreciated that other commands or operations may be provided when in a particular caching mode of operation.

In yet another embodiment, a distributed method for updating timestamp information related to stored data is provided. Such timestamp distribution may be used in association with the caching service for web service requests as discussed above. For instance, it is appreciated that timestamp information for data may need to be made consistent across multiple datasets (e.g., located at different datacenters). It is realized that in high-volume transaction systems such as a web-based transaction system, it may not be feasible to adequately transmit timestamp information in an effective manner between systems due to overhead, network traffic, performance, and other considerations. In one embodiment, the caching server may execute a background process that expires According to one embodiment, a record expiration process includes an asynchronous or background process that executes on intervals (e.g., as set in a caching server control file) in each of the servers defined in the active/single, active/standby and active/active systems. According to one embodiment, the server startup process starts an expiration task for each partition/user file defined in the servers with the interval defined in the caching server control file. Each expiration task establishes and global ENQ or lock across the Sysplex to ensure serialization of the expiration process for each partition/user. The global ENQ or lock is released when the expiration task completes processing of the partition/user file. Caching server expiration tasks may be started on both systems in the active/standby and active/active configuration.

In active/single, active/standby and active/active configurations, the timestamp on each record gets set on POST/PUT requests when 'last update time' or LUT is specified with a corresponding 'time to live' or TTL value, which may be expressed in seconds. Another option is 'last access time' or LAT where the time stamp on each record gets set on GET/POST/PUT requests with the corresponding TTL value. The minimum TTL may be, for example, 300 seconds. The maximum TTL may be, for example, 86400 seconds. A default value may be set when the TTL value is not specified. For instance, the default value when not specified may be 1800 seconds.

According to one embodiment, one advantages of a caching server over other distributed database products is that records do not get replicated across nodes (e.g., CICS servers) within a cluster (e.g., a Sysplex), as the file systems are accessible to all CICS servers and LPARs within a z/OS Parallel Sysplex. In one implementation, replication of POST/PUT (add/update) requests are performed across active/standby and active/active data centers for all POST/PUT requests.

Another advantage includes, according to one embodiment, how a caching server handles GET and LAT requests, as the time stamp is updated for each of these requests on the local system that receives the request. However, according to one embodiment, these requests are not replicated across data centers. It is appreciated that replicating GET/LAT information across data centers would cause excessive and unnecessary network, processor and I/O overhead.

According to one embodiment, a caching server handle does not need to keep time stamps synchronized across data centers when GET/LAT is utilized. Rather, according to one embodiment, time stamp information is used for record expiration, so instead of updating the time stamp on every GET/LAT request, a caching server utilizes a technique called referred to herein as a time stamp exchange during the expiration process. When an expiration task is processing a partition/user file on either the active/standby or active/active systems, each record is read sequentially and the time stamp and time to live (TTL) are used to determine if the record is to be expired. When a record is eligible to be expired on the local system, a request is sent to the opposite (remote) system to delete the expired record. If the record is not eligible to be expired on the remote system, then the time stamp is returned by the time stamp exchange process to the expiration process and the time stamp updated on the local system. If the record is eligible to be expired on the remote system, then the record is deleted on the remote system, and is then deleted on the local system.

Further, a capability may be provided that permits timestamp information to be maintained for a data element based on when the data was last accessed. For instance, most data elements only information that identified when a data element was last updated, not when it was last accessed. To this end, timestamp information may be provided that indicates when the particular data entry was last accessed.

Figure 10:
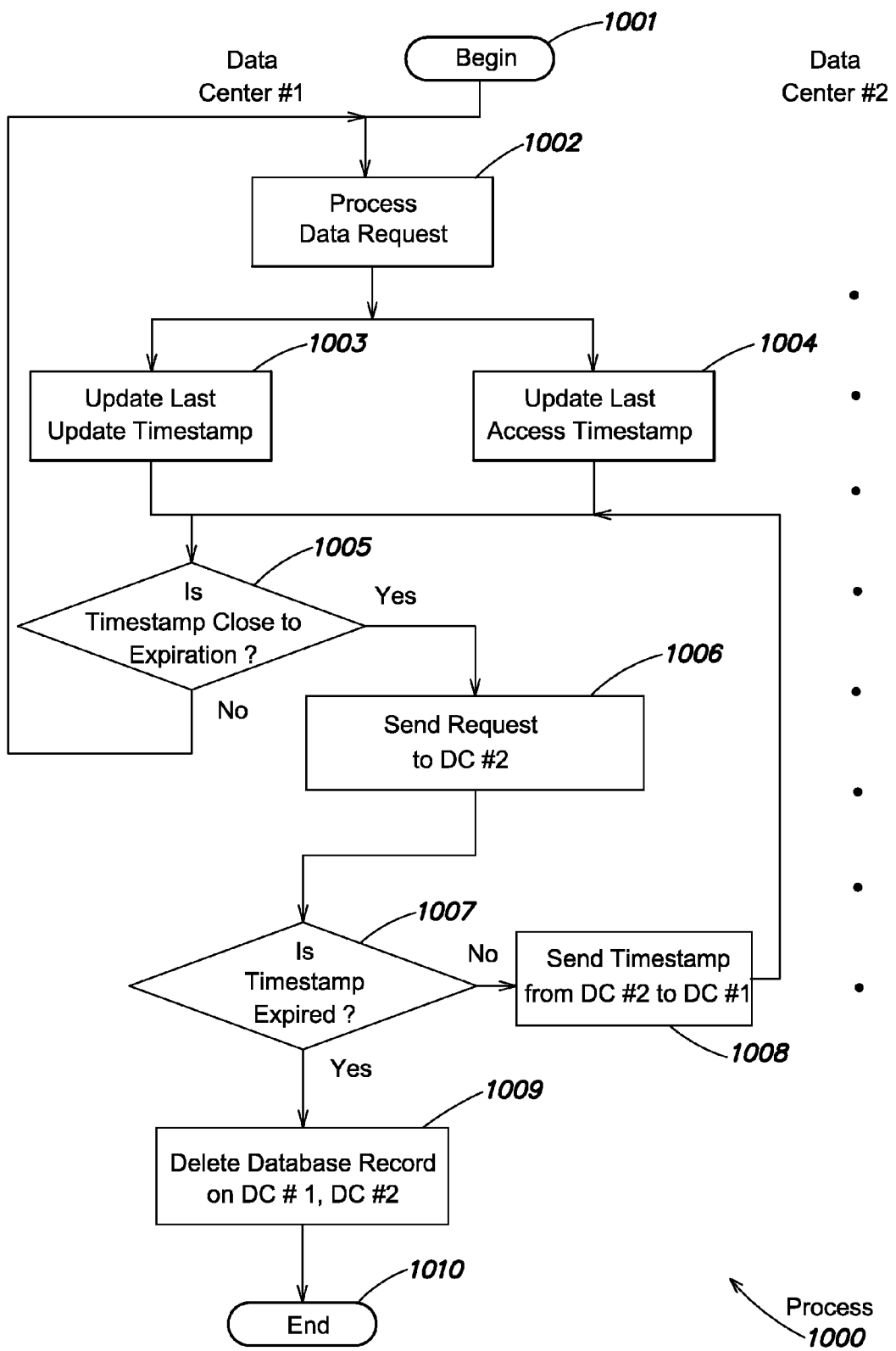
FIG. 10 shows a process for updating timestamp information according to one embodiment of the present invention.

FIG. 10 shows an example process for updating timestamp information according to one embodiment of the present invention. In particular, FIG. 10 shows a process 1000 for determining, among servers distributed among multiple data centers, when a particular database record should be deleted. A block 1001, process 1000 begins.

At block 1002, a server (e.g., a virtual server associated with a web request caching service) receives and processes a data request. For instance, there may be one or more operations relate to database entries that may cause the server to update the timestamp associated with a particular database entry. For instance, at block 1003, the server may update a last update timestamp (LUT) associated with a right to a database instance. According to one embodiment, the server may also be capable of updating a timestamp based on a last access (e.g., a last access timestamp (LAT) updated at block 1004.

Further, each of the servers that may be performing operations related to the same database entries may need to determine when such entries should be deleted from the database. For instance, a block 1005, a server determines whether a timestamp associated with the database entry is close to expiration. If not, the server continues to service database requests. If the timestamp is close to expiration, the server may send a request (e.g., at block 1006) to a corresponding server from another data center (e.g., a server located at data center #2). If it is determined (e.g., at block 1007) that the timestamp associated with that database record is expired, both servers may delete the database record in the databases at both data centers (e.g., datacenters #1 and #2). If not, the datacenter may send its more recent timestamp to data center #1, and the database entry continues to exist. That is, other servers may be operating on database entries, and if another server has a more recent entry, then that database entry should not be deleted. Such timestamps may be checked periodically, eliminating the need for large numbers of messages to make data entries consistent. At block 1010, process 1000 ends.

Example Computer Implementations

Processes described above are merely illustrative embodiments of systems that may be used to cache web service requests. Such illustrative embodiments are not intended to limit the scope of the present invention, as any of numerous other implementations for performing the invention. None of the claims set forth below are intended to be limited to any particular implementation of a caching system, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, ARM Cortex processor, Qualcomm Scorpion processor, or any other type of processor. It should be appreciated that one or more of any type computer system may be used to partially or fully automate management of prepaid debit cards according to various embodiments of the invention. Further, the software design system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. Computer system may be also implemented using specially programmed, special purpose hardware. In a computer system there may be a processor that is typically a commercially available processor such as the well-known Pentium class processor available from the Intel Corporation. Many other processors are available. Such a processor usually executes an operating system which may be, for example, the Windows NT, Windows 2000 (Windows ME), Windows XP, Windows Vista, Windows 7, or Windows 8 operating systems available from the Microsoft Corporation, MAC OS X Snow Leopard, MAC OS X Lion operating systems available from Apple Computer, the Solaris Operating System available from Sun Microsystems, iOS, Blackberry OS, Windows 7 Mobile or Android OS operating systems, or UNIX available from various sources. Many other operating systems may be used.

Some aspects of the invention may be implemented as distributed application components that may be executed on a number of different types of systems coupled over a computer network. Some components may be located and executed on mobile devices, servers, tablets, or other system types. Other components of a distributed system may also be used, such as databases (e.g., the DB2 database, SQL databases, the mongoDB database, etc.), cloud services, or other component types.

The processor and operating system together define a computer platform for which application programs in high-level programming languages are written. It should be understood that the invention is not limited to a particular computer system platform, processor, operating system, or network. Further, it should be appreciated that multiple computer platform types may be used in a distributed computer system that implement various aspects of the present invention. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). Certain aspects of the present invention may also be implemented on a cloud-based computer system (e.g., the EC2 cloud-based computing platform provided by Amazon.com), a distributed computer network including clients and servers, or any combination of systems.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more computer systems that include one or more components of distributed system 100, each of the components may reside in one or more locations on the system. For example, different portions of the components of system 100 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 11:
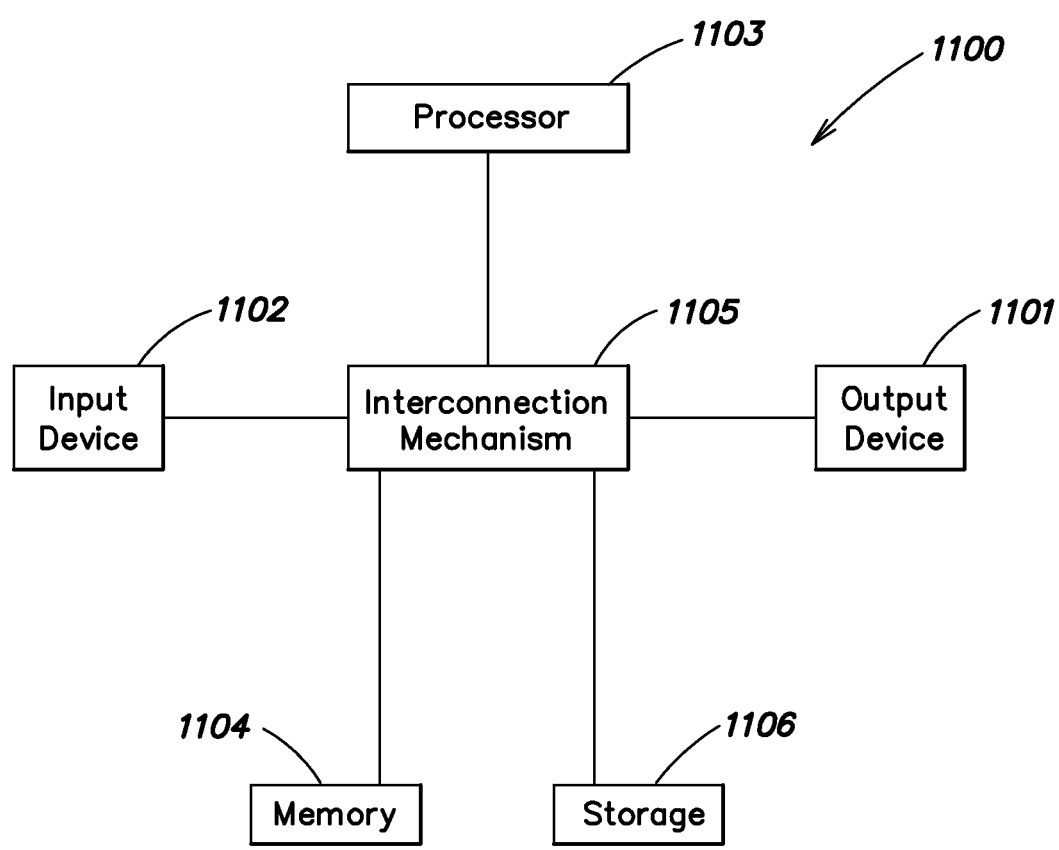
FIG. 11 shows an example computer system upon which various embodiments of the present invention may be practiced.
Figure 12:
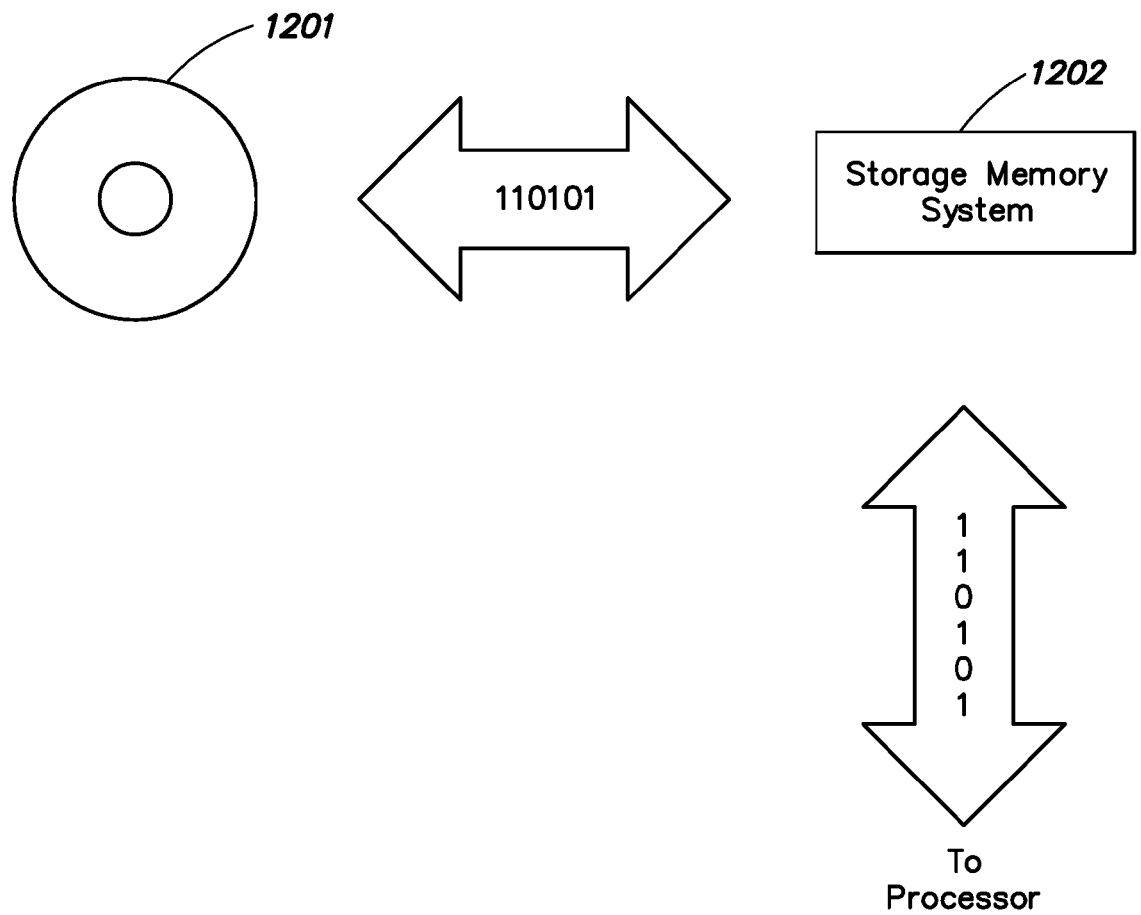
FIG. 12 shows an example storage system capable of implementing various aspects of the present invention.

Any number of systems of system 100 may be implemented on a computer system described below in relation to FIGS. 11 and 12. In particular, FIG. 11 shows an example computer system 1100 used to implement various aspects. FIG. 12 shows an example storage system that may be used.

System 1100 is merely an illustrative embodiment of a computer system suitable for implementing various aspects of the invention. Such an illustrative embodiment is not intended to limit the scope of the invention, as any of numerous other implementations of the system, for example, are possible and are intended to fall within the scope of the invention. For example, a virtual computing platform may be used. None of the claims set forth below are intended to be limited to any particular implementation of the system unless such claim includes a limitation explicitly reciting a particular implementation.

For example, various aspects of the invention may be implemented as specialized software executing in a general-purpose computer system 1100 such as that shown in FIG. 11. The computer system 1100 may include a processor 1103 connected to one or more memory devices 1104, such as a disk drive, memory, or other device for storing data. Memory 1104 is typically used for storing programs and data during operation of the computer system 1100. Components of computer system 1100 may be coupled by an interconnection mechanism 1105, which may include one or more busses (e.g., between components that are integrated within a same machine) and/or a network (e.g., between components that reside on separate discrete machines). The interconnection mechanism 1105 enables communications (e.g., data, instructions) to be exchanged between system components of system 1100. Computer system 1100 also includes one or more input devices 1102, for example, a keyboard, mouse, scanner, trackball, microphone, touch screen, and one or more output devices 1101, for example, a printing device, display screen, and/or speaker. The system may also include any specialized components depending on the application, including any barcode reader, magnetic stripe reader, receipt printer, hand-held or fixed scanners, pin entry devices (PED), or other device types. In addition, computer system 1100 may contain one or more interfaces (not shown) that connect computer system 1100 to a communication network (in addition or as an alternative to the interconnection mechanism 1105).

The storage system 1106, shown in greater detail in FIG. 12, typically includes a computer readable and writeable nonvolatile recording medium 1201 in which signals are stored that define a program to be executed by the processor or information stored on or in the medium 1201 to be processed by the program. The medium may, for example, be a disk or flash memory. Storage system 1106 may also include logical storage comprising a number of physical storage elements. Typically, in operation, the processor causes data to be read from the nonvolatile recording medium 1201 into another memory 1202 that allows for faster access to the information by the processor than does the medium 1201. This memory 1202 is typically a volatile, random access memory such as a dynamic random access memory (DRAM) or static memory (SRAM). It may be located in storage system 1106, as shown, or in memory system 1104, not shown. The processor 1103 generally manipulates the data within the integrated circuit memory 1104, 1202 and then copies the data to the medium 1201 after processing is completed. A variety of mechanisms are known for managing data movement between the medium 1201 and the integrated circuit memory element 1104, 1202, and the invention is not limited thereto. The invention is not limited to a particular memory system 1104 or storage system 1106.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1100 is shown by way of example as one type of computer system upon which various aspects of the invention may be practiced, it should be appreciated that aspects of the invention are not limited to being implemented on the computer system as shown in FIG. 11. Various aspects of the invention may be practiced on one or more computers having a different architecture or components than that shown in FIG. 11.

Computer system 1100 may be a general-purpose computer system that is programmable using a high-level computer programming language. Computer system 1100 may be also implemented using specially programmed, special purpose hardware. In computer system 1100, processor 1103 is typically a commercially available processor such as the well-known Pentium, Core, Core Vpro, Xeon, or Itanium class processors available from the Intel Corporation. Many other processors are available. Such a processor usually executes an operating system which may be, for example, the Windows XP, Windows Vista, Windows 7 or Windows 8 operating systems available from the Microsoft Corporation, MAC OS Snow Leopard, MAC OS X Lion operating systems available from Apple Computer, the Solaris Operating System available from Sun Microsystems, iOS, Blackberry OS, Windows 7 or 8 Mobile or Android OS operating systems, or UNIX available from various sources. Many other operating systems may be used.

The processor and operating system together define a computer platform for which application programs in high-level programming languages are written. It should be understood that the invention is not limited to a particular computer system platform, processor, operating system, or network.

Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud-based computing platform, such as the well-known EC2 platform available commercially from Amazon.com, Seattle, Wash., among others. Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for processing web service transactions, the system comprising:
a plurality of servers, each server comprising a processor adapted to receive and process one or more web service requests, and a memory to store a plurality of timestamps, the plurality of servers comprising:
a first and a second server, each configured to compare a timestamp of the first server and a timestamp of the second server in order to determine if a database record has expired;
wherein the database record is store in a logical storage coupled to the first server, and wherein the timestamp of the first server and the timestamp of the second server are both associated with the database record; and
wherein the first server deletes the database record if it is determined that the timestamp of the first server, and the timestamp of the second server, have both expired.

2. The system according to claim 1, wherein the first and second servers are located in a first and a second datacenter, respectively.

3. The system according to claim 1, wherein the comparing of timestamps is responsive to a determination by one of the first or the second servers that at least one of the first or the second timestamps is close to an expiration time.

4. The system according to claim 1, further comprising a request handler element adapted to distribute a web service request to at least one of the plurality of servers for processing.

5. The system according to claim 4, further comprising a component configured to monitor processing of web service requests by the at least one of the plurality of servers.

6. The system according to claim 5, further comprising a component to determine a failover of the processing of at least one web service request to another one of the plurality of servers upon failure of the at least one server.

7. The system according to claim 1, wherein the web service requests include at least one of a group comprising:
a representational state transfer (REST) service request; and
a simple object access protocol (SOAP) service request.

8. The system according to claim 1, wherein the plurality of servers are operable in at least one of a group of operating modes, the group comprising:
an active/single mode;
an active/standby mode;
and an active/active mode.

9. A method for processing web service transactions, the method comprising acts of:
receiving and processing, by a first servers, a web service requests related to a database record stored on both a database associated with the first server and a database associated with a second server, wherein the first server comprises a processor to process the web service requests and a memory to store a timestamp of the first server, wherein the method further comprises acts of:
determining if the database record has expired by comparing the timestamp of the first server with a timestamp of the second server, wherein the time stamp of the first server is associated with the database record stored on the database associated with the first server, and wherein the timestamp of the second server is associated with the database record stored on the database associated with the second server; and
deleting, by the first server, the database record stored on the database associated with the first server if it is determined that the timestamp of the first server and the timestamp of the second server have both expired.

10. The method according to claim 9, further comprising an act of updating the timestamp of the first server responsive to a determination that the timestamp of the second server has not expired.

11. The method according to claim 9, further comprising an act of locating the first and second servers in a first and a second datacenter, respectively.

12. The method according to claim 9, wherein the act of determining if the database record has expired is responsive to an act of determining, by one of the first and second servers, that at least one of the first or the second timestamp s is close to an expiration time.

13. The method according to claim 9, further comprising an act of distributing, by a request handler element, a web service request to one of the first or the second servers for processing.

14. The method according to claim 13, further comprising an act of monitoring processing of the web service requests by the one of the first or the second servers.

15. The method according to claim 14, further comprising an act of determining a failover of the processing of the web service request to the second servers upon failure of the first server.

16. The method according to claim 9, wherein the web service requests includes at least one of a group comprising:
    a representational state transfer (REST) service request; and
    a simple object access protocol (SOAP) service request.

17. The method according to claim 9, wherein the first and the second servers are operable in at least one of a group of operating modes, the group comprising:
    an active/single mode;
    an active/standby mode; and
    an active/active mode.

* * * * *